Aug. 1, 1950     R. E. SHOOK     2,517,039
FOLDING LOUNGE CHAIR
Filed Feb. 7, 1947     8 Sheets-Sheet 1
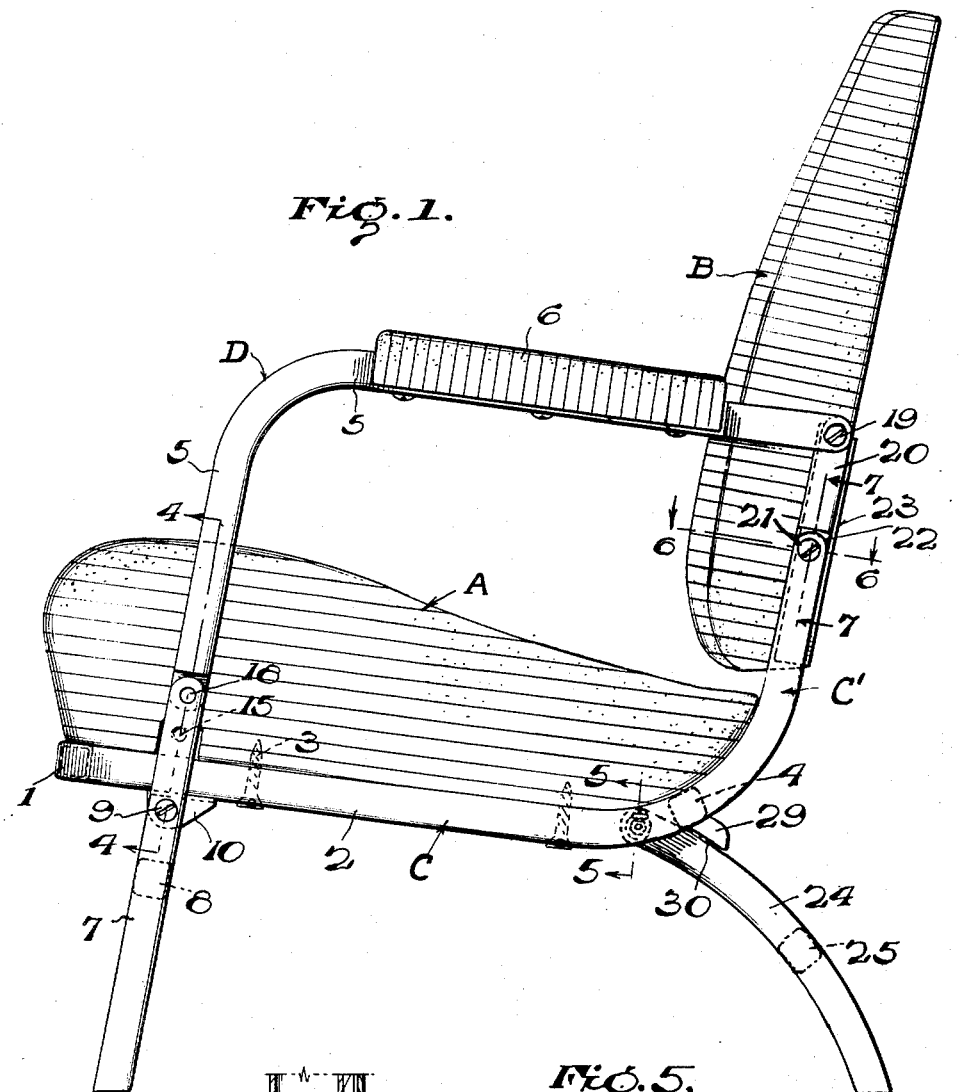
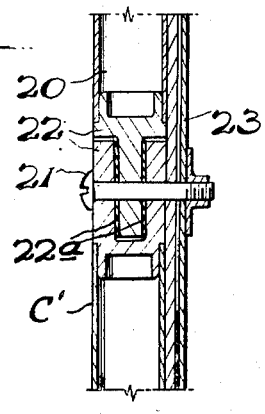
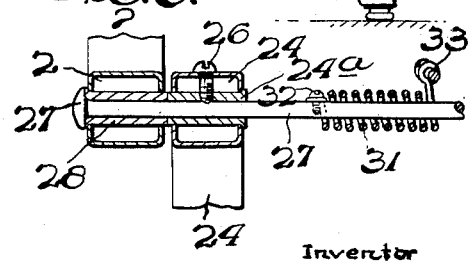
Inventor
Richard E. Shook.
BY
Attorney Aug. 1, 1950        R. E. SHOOK        2,517,039
FOLDING LOUNGE CHAIR
Filed Feb. 7, 1947        8 Sheets-Sheet 2
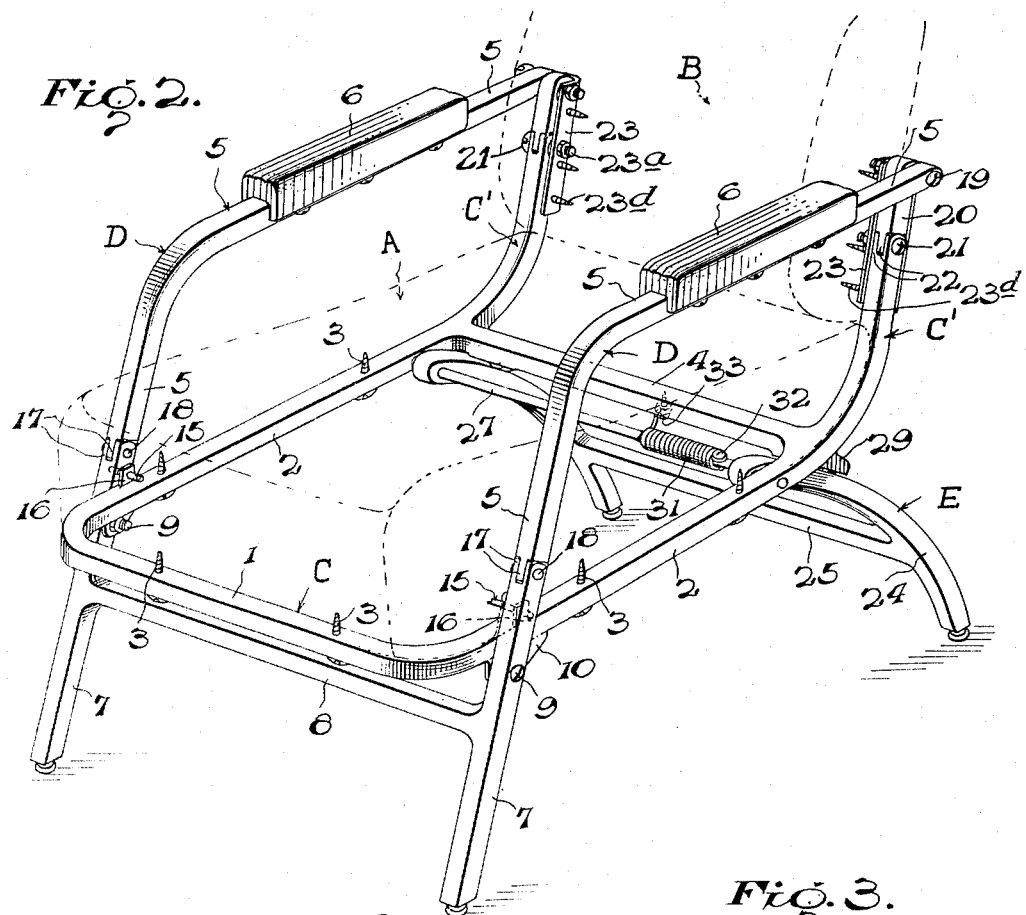
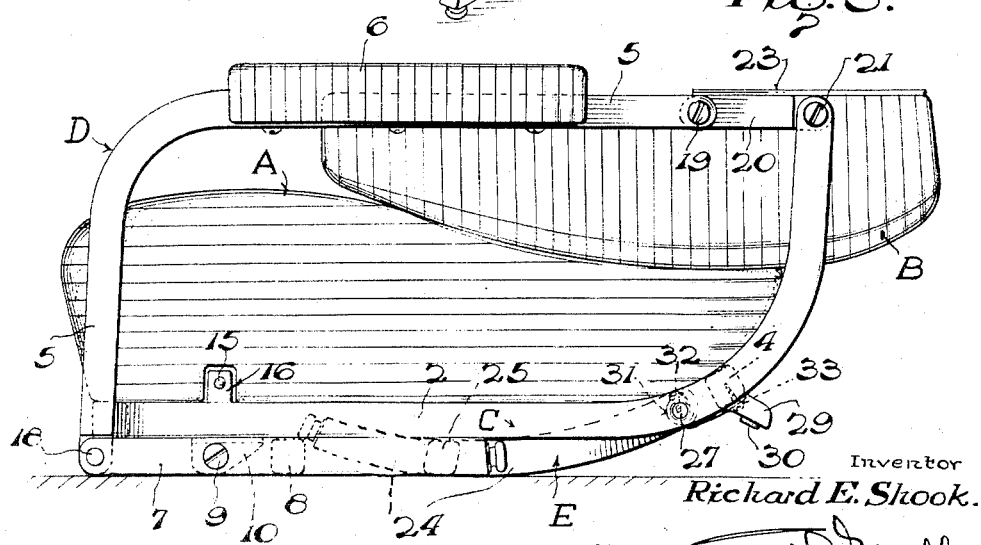
Inventor
Richard E. Shook.
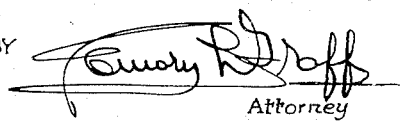
Attorney Aug. 1, 1950 R. E. SHOOK 2,517,039
FOLDING LOUNGE CHAIR
Filed Feb. 7, 1947 8 Sheets-Sheet 3
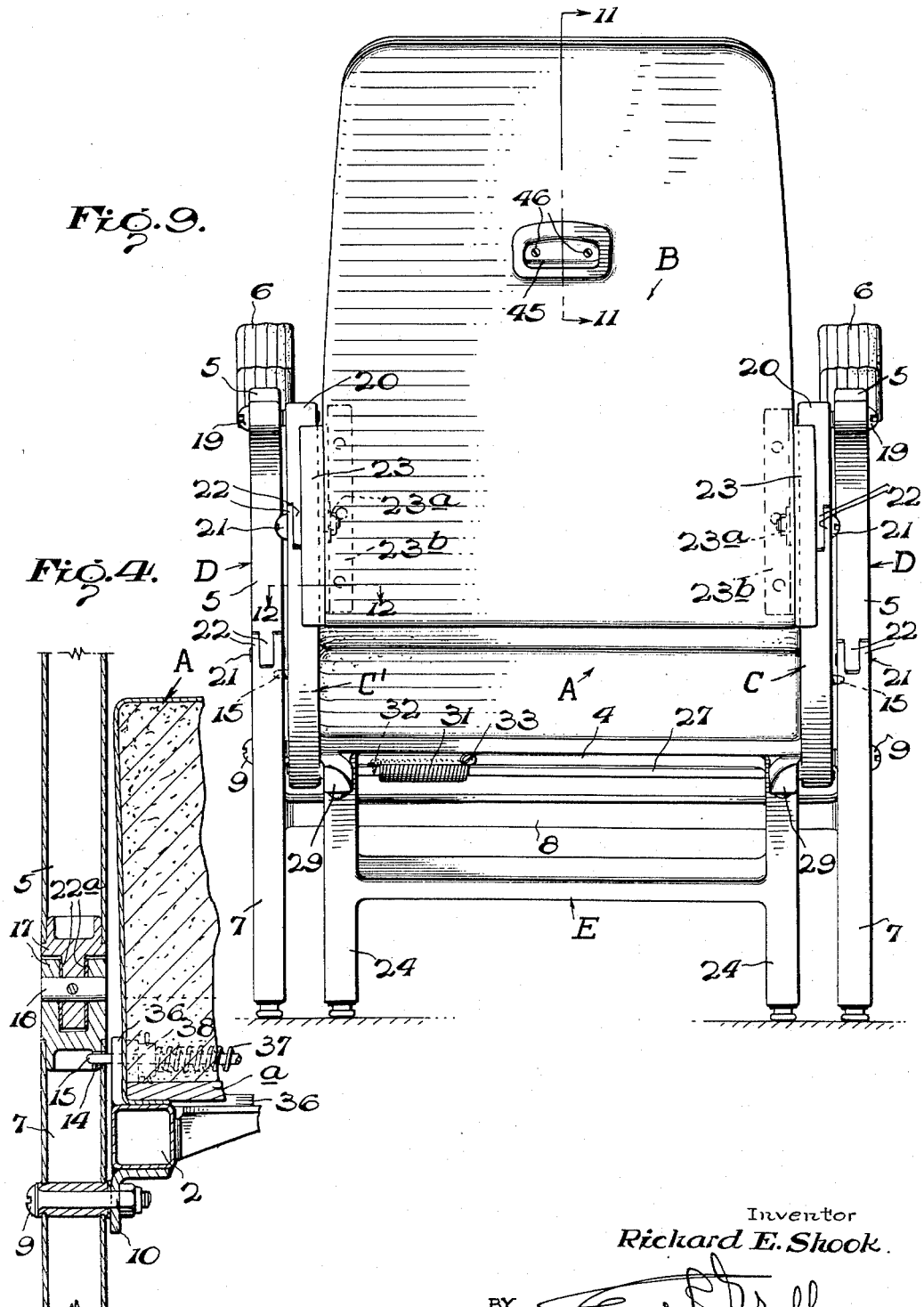
Inventor
Richard E. Shook.
BY
Attorney Aug. 1, 1950 R. E. SHOOK 2,517,039
FOLDING LOUNGE CHAIR
Filed Feb. 7, 1947 8 Sheets-Sheet 4
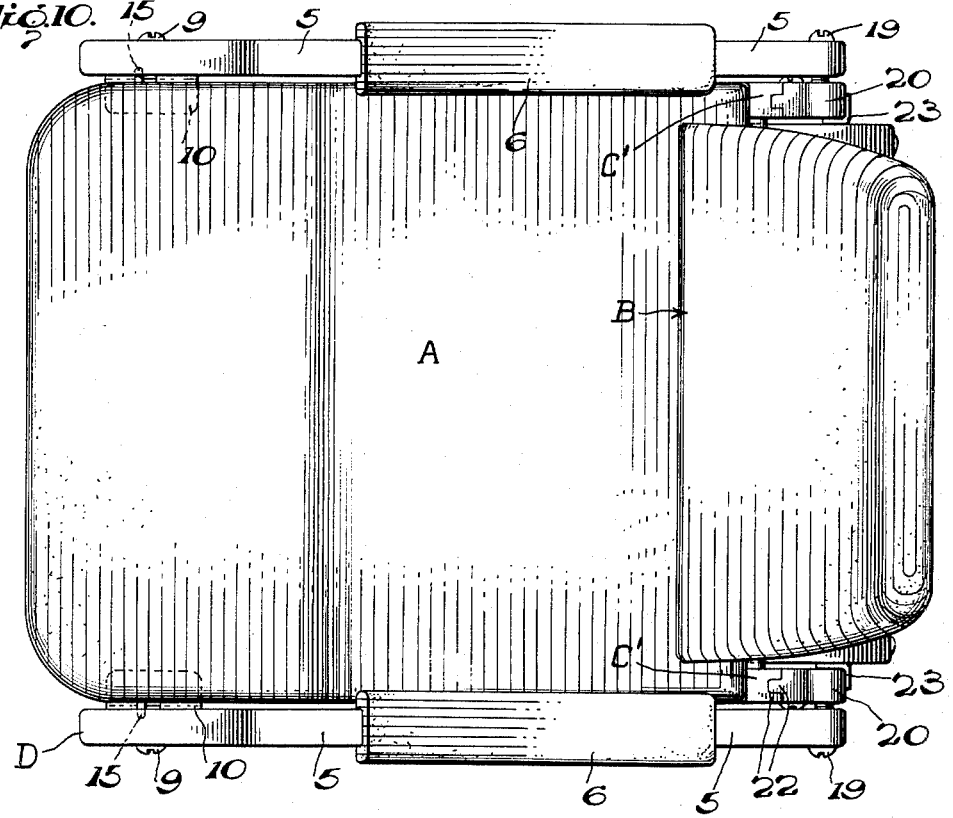
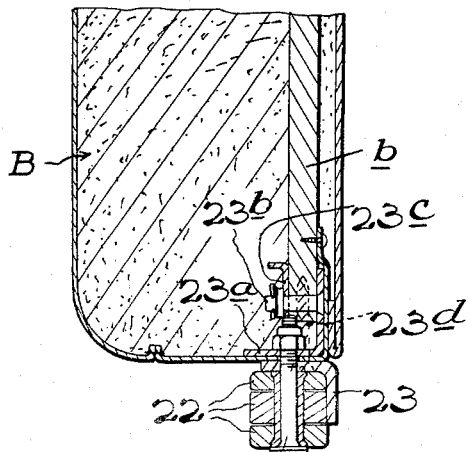
Inventor
Richard E. Shook.
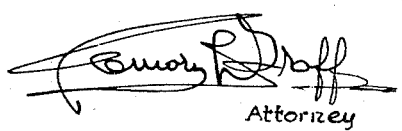
Attorney Aug. 1, 1950   R. E. SHOOK   2,517,039
FOLDING LOUNGE CHAIR
Filed Feb. 7, 1947   8 Sheets-Sheet 5
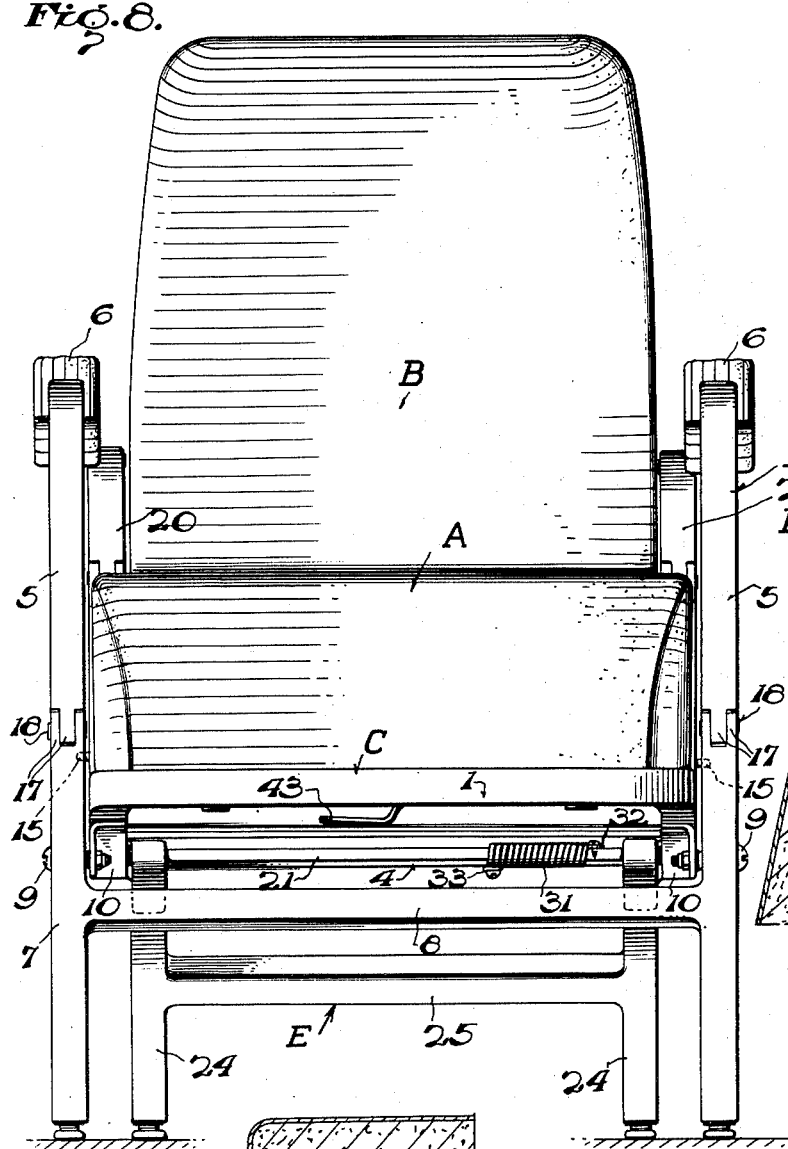
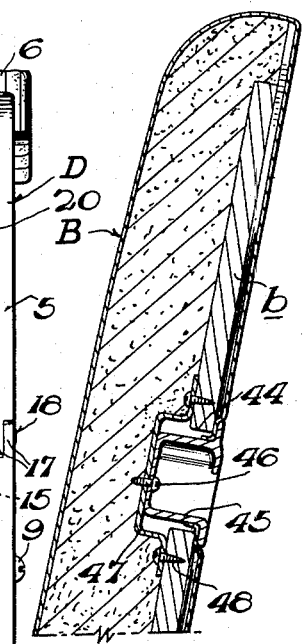
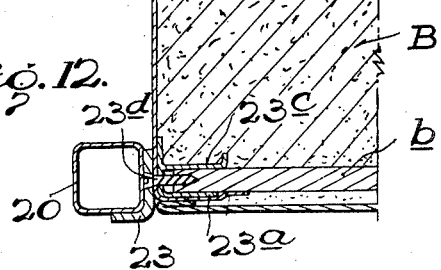
Inventor
Richard E. Shook.
BY 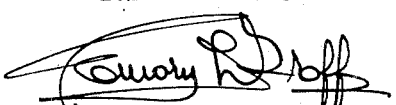
Attorney Aug. 1, 1950 R. E. SHOOK 2,517,039
FOLDING LOUNGE CHAIR
Filed Feb. 7, 1947 8 Sheets-Sheet 6
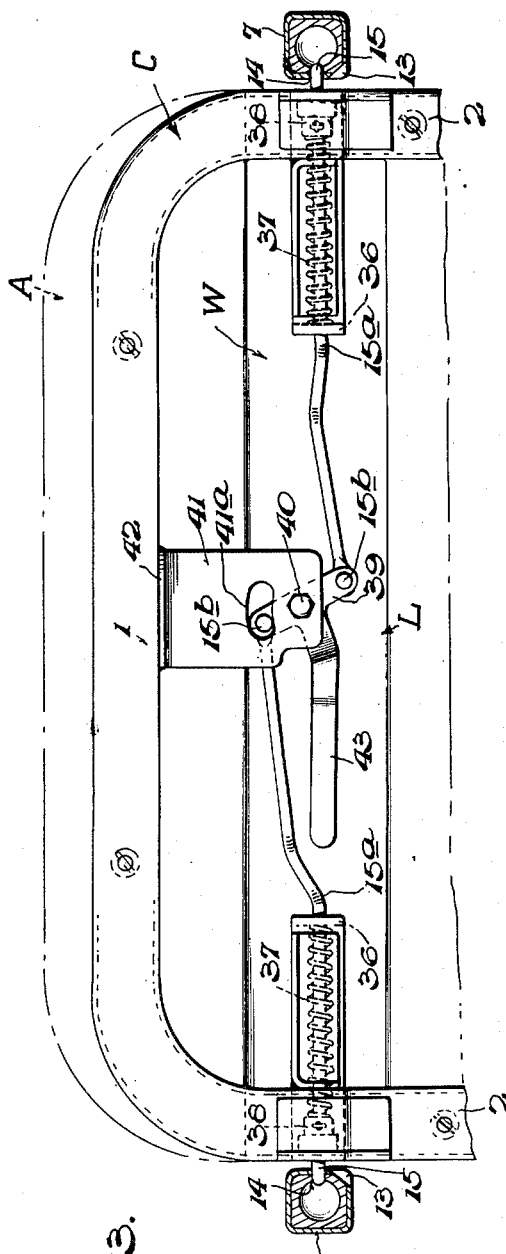
Inventor
Richard E. Shook,
BY
Attorney

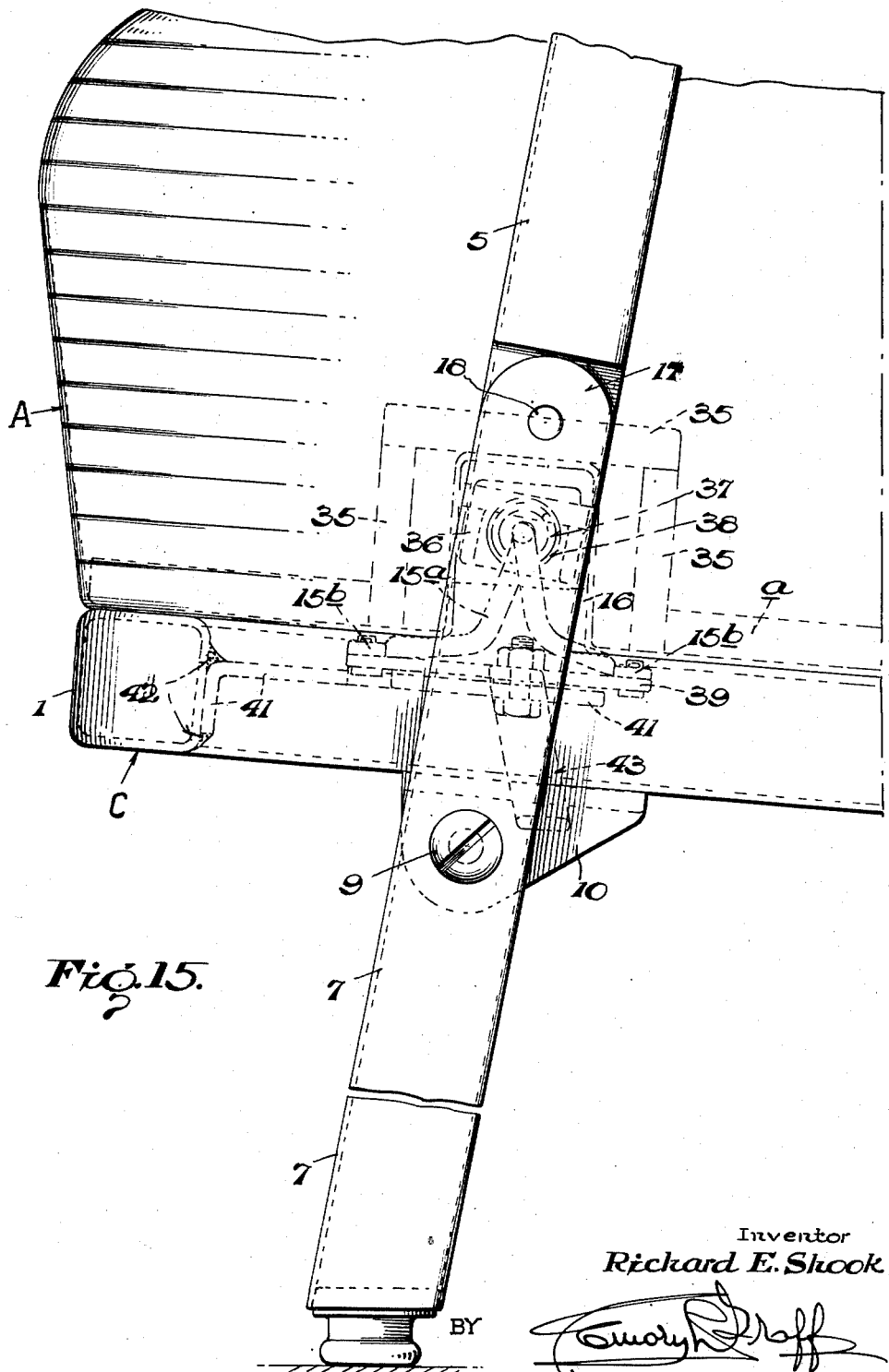

Aug. 1, 1950 R. E. SHOOK 2,517,039
FOLDING LOUNGE CHAIR
Filed Feb. 7, 1947 8 Sheets-Sheet 8
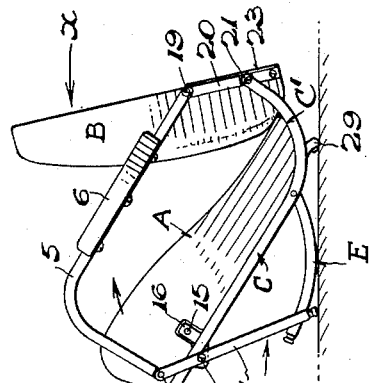
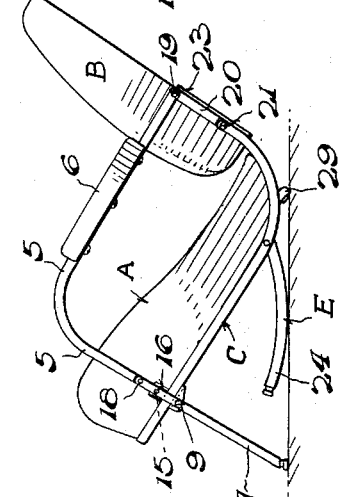
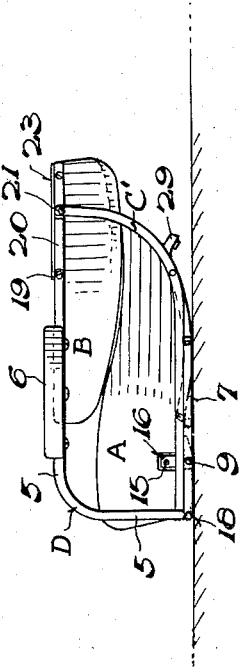
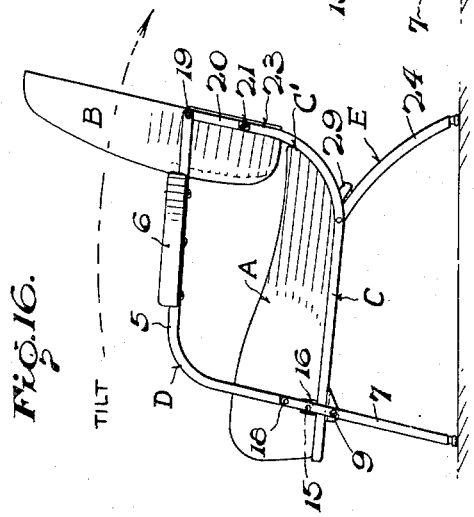
Inventor
*Richard E. Shook.*
BY
Attorney Patented Aug. 1, 1950

2,517,039

UNITED STATES PATENT OFFICE 2,517,039

FOLDING LOUNGE CHAIR

Richard E. Shook, Youngstown, Ohio, assignor to The General Fireproofing Company, Youngstown, Ohio, a corporation of Ohio Application February 7, 1947, Serial No. 727,029

10 Claims. (Cl. 155—148)

This invention relates to furniture, and more particularly to an upholstered chair which may be compactly collapsed to occupy a minimum storage space.

One of the objects of the invention is to provide a chair of the lounge type which may be readily and easily folded, when not in use, and, on the other hand, easily erected to usable position; both operations being accomplished by simple and unskilled manual manipulation. More especially, the invention is directed to a chair having form fitting seat and back cushions preferably of molded foam rubber, and suitably upholstered, and which are mounted on a framework responsive to appropriate manual manipulation so that the back member and the seat member nest together when the chair is collapsed in such a way that the cushion elements, and the related frame parts, in their folded positions, occupy a minimum volume of storage space. In other words, when the chair is in its folded condition, it may be stored in an oblong rectangular space of substantially no greater cubic capacity than the average equivalent unit of travelling equipment or luggage. In that connection, the invention has particular utility in Pullman cars and on shipboard. For example, chairs made according to the present invention may readily, when collapsed, be stored at night beneath the sofa-bed in the bedroom or compartment of a Pullman car, or, in the stateroom of a ship. On the other hand, when it is desired to have more seating capacity in the room by day, the chair may be withdrawn from storage and erected to provide comfortable mobile seats.

Another object of the invention is to provide a chair of the type described including a rigid main frame for supporting the seat cushion, and collapsible side frames including jointed arm and front leg portions, said arm portions including links having the back cushion secured thereto, and the main frame having a rear leg unit rockably connected therewith, under spring tension, so that it automatically takes usable position in the initial setting up of the chair, and so remains until the chair is again intentionally collapsed.

Another object of the invention is to provide a main frame, side frames, and a rear leg unit so arranged and assembled to be freely movable relative to each other during erection and collapsing, and whose joints and pivots are so disposed that the chair will remain solid and firm when erected by virtue of the location of said joints and pivots as well as the distribution of weight relative to the center of gravity, so that, in its erected position, the chair has all the advantages of stability and firmness incident to a chair having a solid frame.

With the above and other objects in view, which will more readily appear as the nature of the invention is better understood, the same consists in the novel construction, combination and arrangement of parts, hereinafter more fully described, illustrated and claimed.

A preferred and practical embodiment of the invention is shown in the accompanying drawings in which:

Figure 1 is a side elevation of the improved chair in erected position;

Figure 2 is a perspective view of the framework of the chair with the seat and back cushions shown in dotted lines to more conveniently expose the frame structure;

Figure 3 is a side elevation of the chair shown in Figure 1 in its completely collapsed compact position;

Figure 4 is a detail sectional view taken on the line 4—4 of Figure 1;

Figure 5 is a detail sectional view taken on the line 5—5 of Figure 1;

Figure 6 is a detail sectional view taken on the line 6—6 of Figure 1;

Figure 7 is a detail sectional view taken on the line 7—7 of Figure 1;

Figure 8 is a front elevation of the chair shown in Figure 1;

Figure 9 is a rear elevation of the chair shown in Figure 1;

Figure 10 is a top plan view of the chair shown in Figure 1;

Figure 11 is a detail vertical cross sectional view taken on the line 11—11 of Figure 9;

Figure 12 is a detail horizontal sectional view taken on the line 12—12 of Figure 9;

Figure 13 is a partial bottom plan view of the front of the main frame and seat cushions illustrating the latch mechanism for holding the lower sections of the front leg members of the side frames in rigidly erected position;

Figure 14 is a front elevation of the construction shown in Figure 13;

Figure 15 is an enlarged detail elevation of the front of the main frame, seat cushions, and lower section of one of the front leg members, indicating the location of the latch mechanism in relation to the said leg member.

Figures 16, 17, 18 and 19 are a series of diagrammatic views illustrating the cycle of collapsing the chair from fully erected to completely collapsed position.

Similar reference characters designate corresponding parts throughout the several figures of the drawings.

Referring to Figures 1 and 2, it will be observed that the present construction includes in its organization a seat cushion A and a back cushion unit B, preferably made of molded foam rubber mounted in each instance on a stiff support such as plywood sections respectively designated as $a$ and $b$, and the whole assembly covered with suitable fabric. The inner related faces of the seat and back cushions are preferably formed on complemental arcs to not only provide form fitting profile but also to substantially match or nest when the chair is in the collapsed condition shown in Figure 3.

The major structural elements include a main frame C of substantially U-shaped formation, and disposed horizontally, while the rear ends thereof are turned upwardly as indicated at C' to provide substantially right angularly disposed spaced extensions of the main frame. The side frames which form the arm rests and the front leg members are designated generally as D and the rear leg unit is indicated as E. As will be apparent from the drawings, the several essential elements just referred to are interconnected for appropriate movement to effect the desired results, and these elements will not be referred to more in detail.

The main frame C, as previously indicated, is of substantially U-shaped formation and includes the front rail 1 and the side rails 2 which are intended to support the seat cushion A which is preferably secured to the frame by the screws or equivalent fastenings 3 (Figure 2). The side rails 2 are preferably joined near the point where they sweep upwardly as at C' by a rear rigid cross brace 4.

All parts of the main frame C, and likewise all parts of the entire framework, may be made of metal, preferably aluminum tubing.

The side frames D include the angular arms 5 whose horizontal portions carry cushioned arm rests 6, and the downwardly extending portions are pivotally connected to the relatively vertically disposed front legs 7. These legs are connected at a point below the main frame C by a rigid cross member or brace 8, thereby not only insuring concomitant action of both side frames D in their erecting and collapsing movements, but also stabilizing the side frames relative to the main frame when the chair is erected. The front legs 7 are pivotally connected to the main frame by the pivot bolts 9 mounted in the brackets 10 rigidly depending from the underside of the rails 2—2 of the main frame.

At a point above the pivot 9, each front leg is provided with a bevelled latch face 13 (Figure 13), leading to a keeper hole 14 formed on the inner face of the tubular leg section. Each keeper hole 14 is intended to receive the locking end of simultaneously action latches 15 diagrammatically indicated in Figure 2, and shown in greater detail in Figure 13. These latches are a part of the latch mechanism designated generally as L, and referred to more in detail later on. The latches 15 are preferably guided in the upstanding guide plates 16 welded or otherwise secured to the upper faces of the side rails 2—2 of the main frame C, as shown in Figures 2, 3, 15 and 16 to 19, inclusive.

Referring further to the front legs 7 of the side frames D, it will be observed that the same connect with the lower ends of the arms 5 by mortise and tenon type knuckle joints 17 including the transverse pivots 18. Thus the front legs break with the arms 5 on the pivots 18.

The rear ends of the arm portions 5 of the side frames D are pivotally connected by substantial pivot elements 19 with the upper ends of link members 20. The lower end of these members are connected to the upper extremity of the upward extensions C' of the main frame by a substantial pivot element 21 connecting a mortise and tenon joint arrangement 22, complementally formed on the links and the upper ends of the main frame (see Figure 7). The pivot 22 also constitutes the axis of pivoting movement for the back cushion unit B, and the links act as levers during collapsing and erecting movement.

Thus, it will be seen that the side frames D which comprise the arms 5 and front legs 7, include the pivotal connections 18, 19 and 21, the links 20 being a part of the side frames, while the opposite side frames which are united by the brace 8 are, in turn, pivotally connected to the main frame C by the pivots 9. At this point, it may be also noted that the mortise and tenon joints 17 and 22 of the side frames are preferably formed of members fashioned after plugs, preferably made of solid aluminum, and which may be welded in the related ends of the juxtaposed aluminum tubing members, thereby to add strength and longer wear to the parts of the framework which assume the greatest stress and strain. Stainless steel shim washers 22a are inserted between the mortise and tenon in each joint to prevent an aluminum to aluminum contact and prevent wear at this point.

Before proceeding to a description of the rear leg unit E, it is desirable to note that the back cushion B, which will be hereinafter described in more detail, is secured to the links 20; which, as previously indicated, are a part of the side frames; by a pair of angle members 23. As will appear in detail from Figures 6, 7, 9 and 12, the said angle members span the joint 21—22 when the chair is erected as shown in Figures 2, 9, 15 and 16, and the outer flanges of said angular members engage the upward extensions C' of the main frame, when the chair is erected, to resist rearward tilting of the back cushion when the chair is occupied.

Referring now to the rear leg unit E, it will be observed that the same includes the legs 24 medially connected by a cross bar 25 and having their upper ends secured by fastenings 26 to a rock shaft 27. This shaft extends between, and has its opposite ends oscillatably mounted in bushings 28 (Figure 5) secured in the rails 2 of the main frame. As shown in Figure 5, for convenience and stability in compensating for manufacturing tolerances, the legs 24, where they receive the rock shaft 27, may be provided with the bushings 24a through which the fastenings 26 pass. With the arrangement described, it will thus be understood that the rear leg unit E, which, in itself, is a rigid frame member, is swingably or rockably mounted on the main frame C.

As shown in Figure 1, and elsewhere, the rear legs 24 are intended to cooperate with rigid abutments 29 welded to the arcuate portions of the main frame C so that when the chair is in its erected position, the rear legs will provide adequate and stable support for the main frame, and the occupant of the chair. The inner face of each abutment 29 may be provided with a rubber pad 30 to deaden the sound of metallic contact between the rear leg unit and the main frame.

A distinctive feature of the rear leg unit is that it is spring biased outwardly to normal erected position. That is to say, the rock shaft 27, as will be seen from Figures 2 and 5, is equipped with a coil spring 31 having one end secured as at 32 to the rock shaft, and the other end secured as at 33 to the rear cross brace 4 of the main frame. The tension of the coil spring 31 is such that it tends normally to rock the entire leg unit toward the abutments 29. The manner in which this leg unit functions under manual manipulation will be discussed in the operation of erecting and collapsing the chair.

As previously indicated, the front leg members 7 of the side frames are held in locked or latched position when the chair is erected by the latches 15 of the latch unit L shown in Figures 13 and 14. Referring to these figures, it will be understood that the mechanism here shown is simply by way of example and not by way of limitation, and while the chair assembly will remain erect without a latch mechanism, it is preferably used to insure absolute security when the chair is erected. Moreover, when the front legs 7 are locked, the chair cannot be collapsed by forward pressure on the rear of the back cushion B.

Therefore, it will be understood that the mechanism shown has been found to be one practical way of securing the chair erect and operating the latch ends 15 of the rods 15a. These rods are preferably housed within a well W formed transversely in the bottom of the seat cushion A by a housing of plywood or the like designated generally as 35. The rods 15a are guided in brackets 36 secured to the rails 2—2 of the main frame C. Springs 37 are confined within the limits defined by the inner ends of the brackets 36 and suitable abutments 38 on the rods near the latches 15. Thus, it will be understood that the rods 15a are normally urged outwardly so that the latches 15 are normally thrust outwardly toward the keeper holes 14 in the front legs 7. The inner ends of the rods 15a are connected to a substantially T-shaped actuator plate 39 pivotally mounted as as 40 on a plate 41, welded or otherwise rigidly secured, as at 42, to the inner face of the front member 1 of the main frame C.

As shown in Figures 13, 14 and 15, the plate 41 is substantially horizontally disposed so that the actuating lever 39 operates parallel thereto. The inner ends of the rods 15a are connected to the opposite ends of the head of the T-shaped actuator as indicated at 15b. In the case of the pivotal connection which overlies the plate 41, a slot 41a is provided for clearance. The actuator 39 is provided with a handle 43 adapted to be grasped by the hand and pulled toward the front of the main frame C, or the front of the seat cushion, thereby rocking the actuating plate 39 in such a way that its opposite ends, to which the rods 15a are connected as at 15b, will move in opposite directions and draw the latches 15 inwardly for the purpose of releasing them from the keeper holes 14. It will, of course, be understood that the rods 15a are of angular formation, as shown, to permit of the necessary relative adjustment between the inner and outer ends with relation to the actuator element.

With further reference to the back cushion B and the details of mounting the same on the upper half of the supporting angle members 23 which are carried by the links 20, it will be observed from Figure 6, that the said members 23 cooperate with an inner anchor plate 23a which is bolted, or otherwise secured, to the plywood base b of the cushion by the fastenings 23b, and a reinforcing plate 23c. Thus, the anchor plate 23a constitutes a firm ground for attaching or securing the angle plates 23 to the plywood base. In addition, the inner metallic anchor plates 23a provide adequate support for the pivots 21 which connect the link 20 with the upturned portions C' of the main frame. The inner anchor plate 23a and reinforcing plates or strips 23c, also confine the edges of the plywood support b so that the fastenings 23d may firmly and rigidly unite the back cushion B and the angle members 23 to the links 20, as shown in Figures 2, 6 and 12. The lower half of each supporting angle 23 is adapted to embrace the inner edge of the upturned ends C' of the main frame when the back cushion B is erected to prevent the latter from moving too far backward on the pivots 21. As will be seen, it spans the joint 22.

As will also be seen from Figure 11, the plywood base b of the back cushion B is provided with an opening 44 to receive a hand grip socket 45 secured by fastenings 46 to an anchoring base 47 which, in turn, has flanged edge portions secured by fastenings 48 to the inner face of the plywood base b.

*Operation*

Assuming that the chair is erected as shown in Figures 1 and 16, and it is desired to collapse the same to the position shown in Figures 3 and 19, it is only necessary to manually tilt the chair rearwardly in the direction of the dotted arrows in Figure 16 until the weight or mass of the chair moves rearwardly sufficiently to pass beyond a vertical plane intersecting the point of contact of the lower ends of the rear legs 24 with the floor, thereby automatically causing the rear leg unit to collapse to the position shown in Figure 17. Thus, it will be observed that the rear leg unit E is disposed inwardly beneath the seat cushion A.

The manipulator then reaches beneath the front edge of the seat cushion A and grasps the handle 43 of the latch mechanism L and pulls it forwardly with the result of releasing the latches 15 from the keepers 14 while, at the same time, exerting forward pressure on the back cushion B as indicated by the arrow x in Figure 18. In other words, when the latching mechanism L has unlocked the front leg members, the manipulator, with his fingers in the socket 45 of Figure 11, simply pushes the back cushion B toward the seat cushion A with slight pressure, and the links 20 which carry the back cushion B will act as levers turning on pivots 21 to break the joints 17—18 between the front legs 7 and the arms 5, and since the front and rear legs are then free, the entire chair will automatically fall, without further effort, to the complete collapsed position shown in Figures 3 and 19.

The collapsed chair may be conveniently picked up or moved along the floor and stored if desired. If the chair is picked up, that is lifted from the floor, the rear leg unit will not kick backwardly under the tension of the spring 31 because, as may be pointed out from Figure 2, when the rear leg unit E is completely collapsed, the permanent casters on the extremities of the legs 24 are latched behind the cross bar 8 of the main frame C. In other words, the cross bar or brace 8 serves as a means for holding the rear leg unit E in collapsed position so that if the collapsed chair is turned on its side, or carried, the rear leg unit will not fly backwardly.

The collapsed condition of the side frames provides sufficient frictional resistance to the tendency of the spring actuated rear leg unit to tend to undesirably open while the chair is collapsed. The weight of the back cushion B on the horizontally disposed links 20 also keeps the legs 7 parallel to the underside of the main frame C.

When it is desired to erect the chair from the collapsed condition shown in Figures 3 and 19, it is only necessary for the manipulator to place his hand in the socket 45 and gently pull upwardly and rearwardly on the back, thus slightly rocking the back cushion on pivots 21 so that the links 20 will cause pivots 18 and 19 to force the arms 5 toward the back cushion and also tend to rock the legs 7 so as to tend to bring them to erected position. That is to say, as the back cushion B is lifted manually it swings the links 20 and the latter tend to move the arms 5 of the side frames D which, in turn, through the pivots 18 and 9 cause the front legs 7 to move and release the caster ends of the rear legs 24 from engagement with the cross brace 8. The entire chair thus moves easily toward erected position with the spring actuated rear leg unit assisting in that operation and readily kicking out to engage the abutments 29. As the chair is manually lifted by grasping the back cushion B through the medium of the hand socket 45, all movement of the side frames and rear legs, as well as latches 15, is automatic so that nothing more must be done to hold the chair erect.

From the foregoing, it is believed that the various features in the invention will be readily understood by those skilled in the art, and will, of course, be understood that various changes in the form, proportion and arrangement of parts may be resorted to within the scope of the appended claims.

I claim:

1. A collapsible chair comprising in combination, a main frame including a seat, jointed side frames each including arm and front leg elements interconnected for concomitant movement and movably connected to the main frame respectively by a link and a pivot, a back mounted on the links of the side frames, abutment means on the rear of the main frame, and a rear leg unit comprising rear legs connected by a cross member, a rock shaft freely journalled at its opposite ends in the main frame and having the upper ends of the rear legs fixed thereto, and a coil spring surrounding the rock shaft and having one end secured thereto while its other end is secured to a part of the main frame, whereby, the entire rear leg unit is normally urged toward said abutment means.

2. A collapsible chair comprising in combination, a main frame supporting a seat cushion and including a substantially horizontal portion having upturned rear ends; a pair of side frames each including an arm and a front leg pivoted to the front end of the arm and a link pivotally connected to the rear end of the arm; a pivot for connecting the lower end of each link to the related upturned rear end of the main frame, a back secured to and carried by each of the said links, pivot means connecting the front legs of the side frames with the main frame at a point near the front end of the latter, a rear leg unit mounted on the main frame.

3. A collapsible chair comprising, a main frame supporting a seat cushion and having upturned rear ends spaced to provide clearance for a back cushion disposed therebetween, side frames each including an arm and a front leg pivotally connected, means for pivotally connecting the said front legs to the main frame at a point below said pivotal connection, links pivotally connecting the rear end of each arm with a related upturned rear end of the main frame, a back cushion, supporting angles carrying the back cushion unit and secured to said links, said angles being longer than the links and adapted to embrace the inner edges of the upturned rear ends of the main frame when the back cushion is erected, abutment means on the rear of the main frame, a rear leg unit rockably supported at the rear of the main frame, spring means tending to urge the rear leg unit toward said abutment means, and cooperating latch means on the main frame and the front legs at a point between the pivotal connection of the front legs with the arms and the pivot which connects the front legs with the main frame.

4. A collapsible chair, comprising in combination, a main frame including a substantially horizontal portion and substantially right-angularly disposed spaced-apart rear end portions, a seat cushion carried by the main frame, side frames each including an arm and a front leg, joint and pivot means connecting each front leg with each of the arms, pivots connecting each front leg with the main frame below said joint and pivot means, links pivotally connected at their opposite ends respectively with the rear end portion of each arm of a side frame and with a related extremity of the substantially right-angularly disposed portions of the main frame, a back cushion carried by said links for pivotal movement relative to the seat cushion on the same axis as the pivot which connects the lower end of each link with the extremity of the related substantially right-angularly disposed portion of the main frame, a rear leg unit mounted on the rear of the main frame.

5. A collapsible chair, comprising in combination, a main frame including substantially horizontal and right-angularly disposed portions, side frames each including an arm and a front leg, link means connecting the rear ends of each arm with a related substantially right-angularly disposed portion of the main frame, joint means connecting the adjacent ends of each arm and front leg, pivot means connecting each front leg portions with the main frame, a cross brace connecting the front leg of opposite side frames at a point below the main frame, a seat cushion carried by the main frame, a back cushion mounted on said link means and adapted for pivotal movement toward the seat cushion on the pivots which connect the link means with the substantially right-angularly disposed portions of the main frame, abutment means on the main frame between the substantially horizontal and right-angularly disposed portions, a rear leg unit rockably mounted on the main frame between the substantially horizontal and right-angularly disposed portions thereof, said rear leg unit having legs whose lower extremities move in an arc whose radius is longer than the distance between the cross brace which connects the front legs of the side frames and the distance between the point where the front legs pivotally connect with the main frame, whereby when the side frames and rear leg units are collapsed, said cross brace will serve to restrain the rear leg unit against accidental outward movement, and spring means normally tending to rock the rear leg unit toward said abutment means.

6. A collapsible chair comprising, a main frame including substantially horizontally disposed side rails having upturned rear ends, a seat cushion supported on the main frame, abutments on the side rails of the main frame between the major horizontal portions of the side rails and their upturned ends, side frames each including an arm and a front leg connected by joint means, means for pivotally connecting the front legs to the main frame, links pivotally connected to the rear ends of the arms of the side frames, a pivotal connection also between the link and the upturned rear ends of the side rails of the main frame, a back cushion unit carried by said links and mounted to rock on the same axis as the pivots which connect the lower ends of the links with the side frames, supporting means carried by the back cushion unit for spanning the joint formed by the pivotal connection of the lower ends of the links with the upper upturned rear ends of the side rails of the main frame, and a rear leg unit including opposite rigidly connected legs rockably mounted on the rear of the main frame, and spring means tending normally to rock the rear leg unit toward said abutments.

7. A collapsible chair, comprising, in combination, a main frame having a rear end portion extending above a seat thereon; a pair of side frames each including arm and front leg elements pivotally connected above the plane of the main frame, a swingable link pivoted to the rear end of the arm element and also pivoted to the rear end portion of the main frame, pivots connecting each of the front leg elements of each side frame with the main frame; a back carried by the link of each pair of side frames and projecting below the pivots for connecting the link with the rear end portion of the main frame and rockable toward the seat on said pivots, and a rear leg unit mounted at the rear of the main frame.

8. A collapsible chair, comprising, a combination, a main frame including a seat, a pair of side frames each including arm and front leg elements pivotally joined together above the plane of the main frame, a link for pivotally connecting the arm element of each side frame with the rear portion of the main frame, pivot means for connecting each leg element of the side frame to the forward portion of the main frame below the normal plane thereof, a back supported by the link of each side frame, and a rear leg unit mounted at the rear of the main frame.

9. In a chair, the combination, including, a rigid main frame, a front supporting unit having leg elements pivotally connected to the main frame for rearward swinging movement, a back member, a pivot hingedly connecting the back to the rigid main frame, said pivot being located between the middle portion of the back and the lower edge thereof, a link connected to the back member and having one end mounted on said pivot, and a member pivotally connected at one end to the other end of said link and having its opposite end pivotally connected to the front supporting unit, whereby the back member in moving toward and from the seat cushion will control the pivotal movement of the front supporting unit.

10. A collapsible chair, comprising, in combination, a main frame including a substantially horizontal portion and angularly disposed upturned rear ends, a seat supported on said horizontal portion, a rear leg unit pivoted to the main frame; side frames each including an arm element having a horizontal portion disposed substantially parallel to and above the main frame and a downwardly curved front portion, and a front leg element having its upper end pivotally connected to the downturned end of said arm element, said leg element being pivotally connected with the main frame at a point below the lower edge thereof, and a link pivotally connecting the rear end of the arm element with the related upturned rear end of the main frame; and a back supported on the link of each side frame and rockable forwardly on the pivot which connects the lower end of the link with the main frame to actuate the arm and leg elements of the side frames to collapsed position, whereby, the leg elements are disposed parallel to and beneath the main frame and the arm elements and links become aligned and are also disposed parallel to and above the main frame, thereby to permit the seat, back, front leg elements and rear leg unit to be compactly confined within substantially parallel planes.

RICHARD E. SHOOK.

REFERENCES CITED

The following references are of record in the file of this patent:

UNITED STATES PATENTS

| Number | Name | Date |
| --- | --- | --- |
| 847,707 | Spindler | Mar. 19, 1907 |
| 1,444,024 | Burdick | Feb. 6, 1923 |
| 2,152,014 | Ashe | Mar. 28, 1939 |

FOREIGN PATENTS

| Number | Country | Date |
| --- | --- | --- |
| 59,277 | Denmark | Dec. 8, 1941 |
| 209,957 | Switzerland | Aug. 16, 1940 |